United States Patent
Yoshida et al.

[11] Patent Number: 5,820,726
[45] Date of Patent: Oct. 13, 1998

[54] APPARATUS FOR SUPPLYING SHEET MATERIALS

[75] Inventors: Masaaki Yoshida; Toru Aihara, both of Hiratsuka, Japan

[73] Assignee: The Yokohama Rubber Co., Ltd., Tokyo, Japan

[21] Appl. No.: 833,498

[22] Filed: Apr. 9, 1997

Related U.S. Application Data

[62] Division of Ser. No. 561,019, Nov. 21, 1995, Pat. No. 5,667,610.

[30] Foreign Application Priority Data

Nov. 30, 1994 [JP] Japan .................................. 6-297000
Dec. 9, 1994 [JP] Japan .................................. 6-306507

[51] Int. Cl.$^6$ .................................................. B29D 30/30
[52] U.S. Cl. .................. 156/406.2; 156/133; 156/405.1; 156/406.4; 156/406.6
[58] Field of Search ............................ 156/406.6, 405.1, 156/133, 134, 123, 130, 130.3, 406.4, 406, 421, 414, 415, 406.2, 396, 264, 567, 568

[56] References Cited

U.S. PATENT DOCUMENTS

| | | |
|---|---|---|
| 3,841,941 | 10/1974 | Leblond et al. . |
| 3,852,142 | 12/1974 | Leblond et al. . |
| 3,898,116 | 8/1975 | Katagiri et al. . |
| 4,276,104 | 6/1981 | Riggs . |
| 4,541,886 | 9/1985 | Marlow et al. . |
| 4,875,959 | 10/1989 | Kumagai . |
| 4,891,082 | 1/1990 | Broyles et al. . |
| 5,292,398 | 3/1994 | Miyamoto et al. .................. 156/405.1 |
| 5,415,217 | 5/1995 | Okuyama et al. ...................... 156/130 |

FOREIGN PATENT DOCUMENTS 2-61384  2/1990  Japan .

*Primary Examiner*—Geoffrey L. Knable
*Attorney, Agent, or Firm*—Nikaido, Marmelstein, Murray & Oram LLP

[57] ABSTRACT

This invention provides a method of supplying sheet-like materials in which a plurality of sheet-like materials comprising tire constituent materials and cut into a predetermined size are conveyed by an applying conveyor means and applied onto a building drum. A sheet-like material to be assembled is supplied onto a conveyor belt of the applying conveyor means. Another sheet-like material to assemble, which is held on a transfer drum, is laminated onto the material on the conveyor belt sequentially from one of the end sides thereof to the other with press by rotating and moving the transfer drum. Then a laminate body comprising the sheet-like materials is wound on the building drum.

10 Claims, 10 Drawing Sheets

F I G. 4
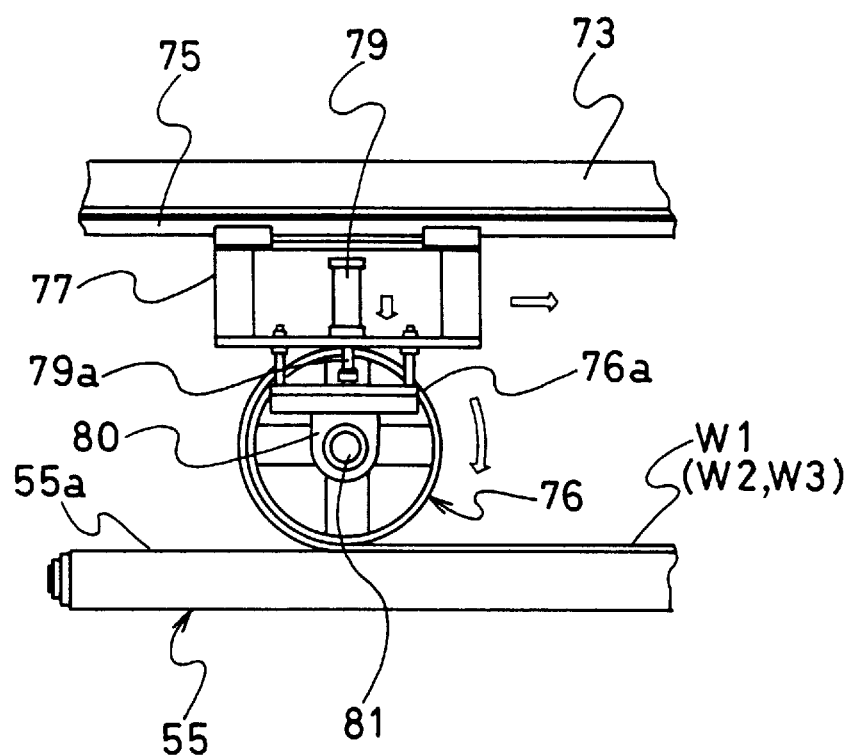

APPARATUS FOR SUPPLYING SHEET MATERIALS

This is a division of application Ser. No. 08/561,019, filed Nov. 21, 1995, now U.S. Pat. No. 5,667,610.

BACKGROUND OF THE INVENTION

This invention relates to a method of supplying a plurality of materials comprising tire constituent materials and cut into a predetermined size to a building drum and an apparatus therefor. More particularly, the present invention relates to a method of supplying sheet-like materials, and an apparatus therefor, which can efficiently laminate and assemble a plurality of sheet materials on a building drum after cutting them in the length equivalent to a width wound on the building drum, the sheet-like materials formed in the width equivalent to length of a circuit of the building drum in advance.

When an inner liner, a carcass, etc, as tire constituent materials are laminated in a tire shaping process, these sheet materials are supplied one by one to a tire building drum and are sequentially laminated and assembled on the building drum. After the distal end portion of the sheet material conveyed on a conveyor belt of a applying conveyor is touched to the building drum, it is wound on the building drum while this drum is being rotated. A plurality of the sheet-like materials can be sequentially laminated and applied on the building drum when this operation is repeatedly carried out.

Such a method, and an apparatus therefor, are described in Japanese Patent Publication No. 61384/1990 filed by the applicant of the present invention, for example.

The supplying method according to the prior art described above still involves the problem that the applying time is long and the working efficiency is low because the sheet materials are applied one by one.

When the sheet materials are applied, air is trapped between the layers of sheet materials and generates air reservoirs. Therefore, an air removal step must be provided.

SUMMARY OF THE INVENTION

It is an object of the present invention to provide a method of supplying sheet materials, and an apparatus therefor, which can efficiently apply a plurality of sheet materials comprising tire constituent materials and cut into a predetermined size, to a building drum.

It is another object of the present invention to provide a method of supplying sheet materials, and an apparatus therefor, which can drastically reduce air pockets which would otherwise occur between the laminated sheet materials, and can eliminate an air removal step.

The objects of the invention described above can be accomplished by a method of supplying sheet materials for conveying a plurality of sheet materials cut into a predetermined size and comprising tire constituent materials, by applying conveyor means and applying them on a building drum, which method comprises supplying the sheet material to be assembled, to a conveyor belt of the applying conveyor means; assembling a sheet material to assemble onto the sheet material to be assembled on the conveyor belt, the sheet material to assemble is wound on the transfer drum so that the sheet material to assemble is laminated with press onto the sheet material to be assembled sequentially from one of the end sides thereof to the other by rotating and moving said transfer drum; and after a lamination step of the sheet materials required is completed, winding the resulting laminate body of the sheet materials to the building drum.

The objects of the invention described above can be also accomplished by an apparatus for supplying sheet materials for conveying a plurality of sheet materials cut into a predetermined size and comprising tire constituent materials, by an applying conveyor means and applying them on a building drum, which apparatus comprises at least two material feed means for supplying the sheet materials to a conveyor belt of the applying conveyor means, disposed adjacent to the applying conveyor means; and transfer means for transferring each of the sheet materials from the material feed means to the applying conveyor means, disposed between each of the material feed means and the applying conveyor means; wherein at least the transfer means for transferring the sheet material to assemble, among the transfer means, includes a transfer drum capable of winding each of the sheet materials on the peripheral surface thereof and retaining it, the conveyor drum is disposed rotatably and movably up and down above the material feed means, and is capable of reciprocating between the applying conveyor means and the material feed means and in a conveying direction of the applying conveyor means; and wherein a sheet material to assemble is sequentially pressed and laminated from one of the end sides thereof to the sheet material on the conveyor belt of the applying conveyor means by rotating and moving the transfer drum.

As described above, a sheet material to assemble is laminated on another sheet material to be assembled on the conveyor belt of the applying conveyor means so as to form in advance a laminate body of the sheet materials to be assembled, and this laminate body is then wound on the building drum. Therefore, a plurality of sheet materials can be applied to the building drum without requiring a long applying time in the prior art wherein the sheet materials are applied one by one. Thus, applying efficiency can be drastically improved.

Moreover, because the transfer drum is moved while being rotated, the sheet-like material to assemble, which is wound on the transfer drum, is pressed and laminated to the sheet material which is sequentially assembled from one of the sides thereof. Accordingly, the sheet materials can be laminated while air which would otherwise be residual is sequentially purged, and the occurrence of air pockets can be drastically reduced. Accordingly, an air removal step can be eliminated.

BRIEF DESCRIPTION OF THE DRAWINGS

FIG. 4 is a side view of the principal portions of FIG. 3;

DESCRIPTION OF THE PREFERRED EMBODIMENTS

Figure 1:
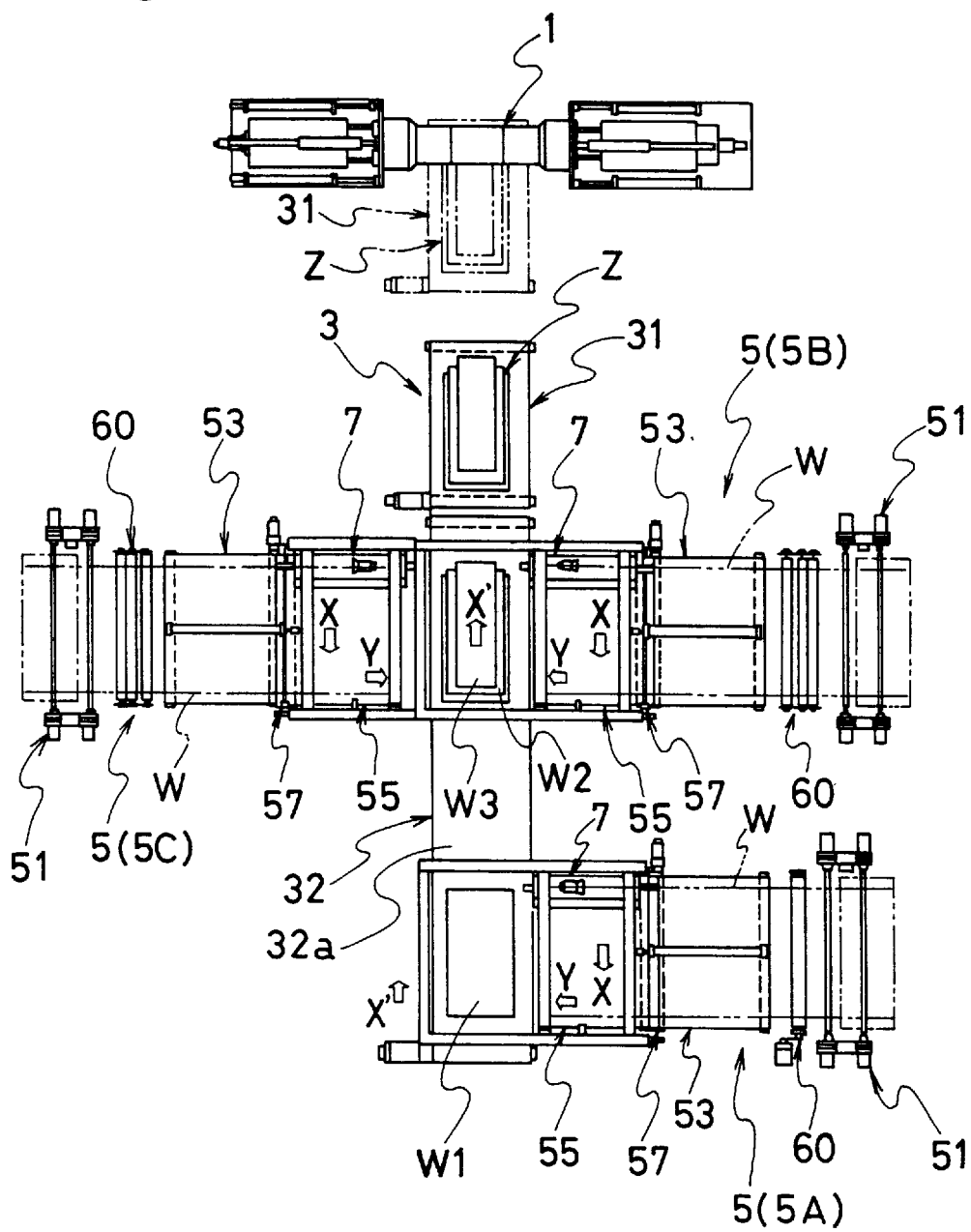
FIG. 1 is a schematic plan view showing an example of a sheet material feeding apparatus according to the present invention.
Figure 2:
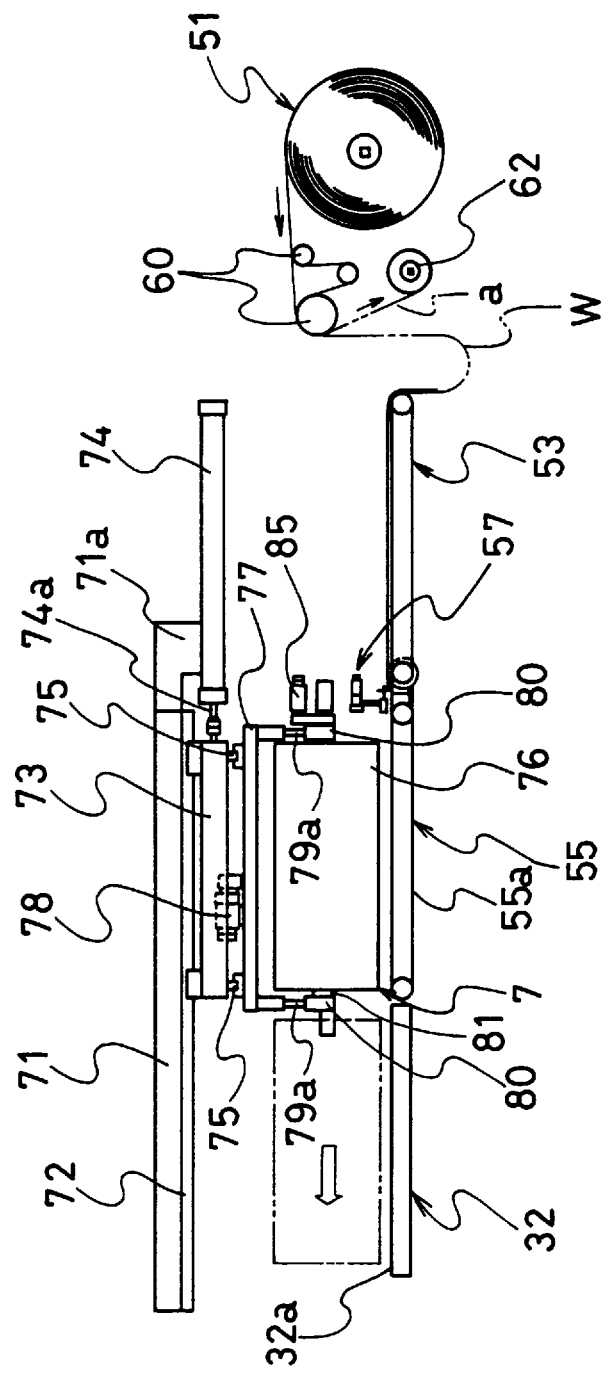
FIG. 2 is a schematic front view showing sheet material feed means and transfer means.
Figure 3:
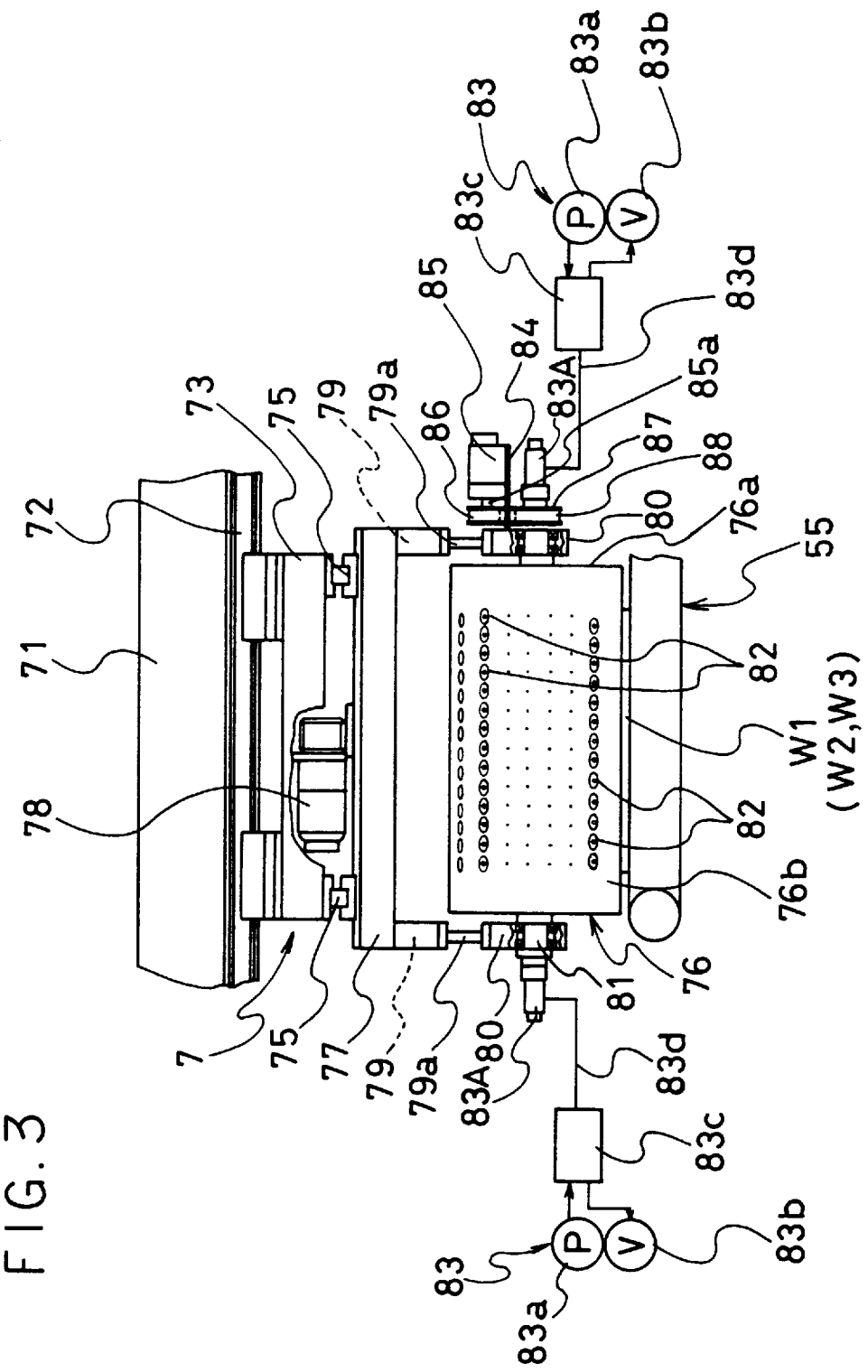
FIG. 3 is an enlarged front view of the transfer means.

In the drawings, reference numeral 1 denotes a building drum for piling a plurality of sheet materials W1, W2, W3 comprising tire constituent materials(for instance, a carcass and two unvulcanized rubber sheets) and cut into a predetermined size and applying them into a cylindrical shape, reference numeral 3 denotes the applying conveyor means for supplying the sheet materials W1, W2, W3 to the building drum 1 and applying them, reference numeral 5 denotes material feed means for supplying the sheet materials W1, W2, W3 to the applying conveyor means 3, and reference numeral 7 denotes transfer means for transferring the sheet materials W1, W2, W3 cut into a predetermined size from the material feed means 5 to the applying conveyor means 3.

The building drum 1 is rotatably disposed with the axis of rotation thereof positioned in a horizontal direction. When a laminate body Z comprising the sheet materials W1, W2, W3 is wound on the building drum 1, the building drum 1 rotates in the interlocking arrangement with an applying conveyor 31 of later-appearing applying conveyor means 3.

The applying conveyor means 3 comprises the applying conveyor 31 disposed adjacent to the building drum 1 in such a manner as to face this building drum 1 and a lamination conveyor 32 disposed continuously from and on the upstream side of the applying conveyor 31 in the conveying direction, for conveying the laminate body Z obtained by laminating the sheet materials W1, W2, W3 to the applying conveyor 31. When the laminate body Z of the sheet materials is applied to the building drum 1, the applying conveyor 31 moves to a position below the building drum 1 disposed above the applying conveyor 31 as indicated by two-dot-chain lines in FIG. 1, and its conveying side rises to the applying position of the building drum 1. After the laminate body Z of the sheet materials is wound on the building drum 1, the applying conveyor 31 lowers and returns to the position at which it is connected to the lamination conveyor 32. Thus, the applying conveyor 31 can reciprocate horizontally and can move up and down. The conveying direction of the applying conveyor means 3 orthogonally crosses the axis of rotation of the building drum 1 when viewed on a plane.

Three sets of the material feed means 5 described above are disposed adjacent to the applying conveyor means 3. They are disposed on both sides of the lamination conveyor 32 along the conveying direction.

Each material feed means 5A, 5B, 5C comprises the elongated sheet material feed means 51 for supplying an elongated sheet material W, first and second feed conveyors 53, 55 disposed between this elongated sheet material feed means 51 and the lamination conveyor 32, and cutting means 57 disposed between the first and second feed conveyors 53 and 55, for cutting the elongated sheet material into the predetermined size.

The elongated sheet material feed means 51 carries a roll of the elongated sheet material W having an adhesion preventive liner a there between into a roll shape and accommodates the material W. The width of the elongated sheet material W corresponds to the length of the piece applied on the building drum 1. In the material feed means 5C for supplying the third sheet material W3 which is to be the innermost layer, the width of the elongated sheet material W corresponds to the length by which, when the third sheet material W3 is wound on the building drum 1, its leading and trailing end portions somewhat overlap with each other. In the material feed means 5B for supplying the outer second sheet material W2, the width of the elongated sheet-like material W is somewhat greater than the length of the sheet-like material W3, and in the material feed means 5A for supplying the first sheet material W1 which will be disposed further outside, the width of the elongated sheet material W is somewhat greater than the second sheet material W2. Thus, the width of the elongated sheet material W becomes progressively greater as it is applied on the building drum 1 on a progressively outer side so that both end portions of each sheet material superpose with one another when the first, second, and third sheet materials W1, W2, W3 are wound on the building drum 1.

The elongated sheet material W equipped with the liner a is pulled out from the elongated sheet material feed means 51 and passes through a plurality of guide rollers 60. After the liner a is peeled from the elongated sheet material W, it is taken up on the liner take-up core 62. After liner a is peeled away from it, the elongated sheet material W is conveyed on the conveyor belt of the first feed conveyor 53 and then to the conveyor belt 55a of the second feed conveyor 55 connected to the first feed conveyor 53. The elongated sheet material W is thereafter cut by cutting means 57 into a sheet material piece having a predetermined size in accordance with a winding width.

The elongated sheet material feed means 51 and the first and second feed conveyors 53, 55 are linearly disposed and convey the elongated sheet material W in such a fashion that its width direction becomes equivalent to a winding direction of the sheet material wound on the building drum 1. The conveying direction of the second feed conveyor 55, which is disposed adjacent to the lamination conveyor 32, orthogonally crosses the conveying direction of the lamination conveyor 32.

The transfer means 7 are disposed between each second feed conveyor 55 and the lamination conveyor 32, respectively. Each transfer means 7 includes a pair of right and left lateral guide rails 72 extended at the lower portions of a pair of right and left support members 71 disposed horizontally in the conveying direction of the second feed conveyor above the second feed conveyor 55 and the lamination conveyor 32, and a slide member 73 capable of moving along the guide rail 72 is suspended from both guide rails 72.

A moving cylinder 74 for reciprocating the slide member 73 along the lateral guide rails 72 is disposed on one of the sides (on the side of the first feed conveyor 53) of the slide member 73. This moving cylinder 74 is horizontally supported through a bracket 71a so provided to the support member 71 as to protrude therefrom. The front end of a rod 74a contracting and extending in the horizontal direction is connected to the slide member 73.

A pair of right and left longitudinal guide rails 75 are disposed on a bottom of the slide member 73 in such a manner as to protrude from the slide member 73 and to extend in a direction orthogonally crossing the lateral guide rails 72. A support member 77 for supporting a transfer drum 76 for transferring the cut sheet material is suspended from the longitudinal guide rails 75. The support member 77 can move along each set of longitudinal guide rails 75. A driving motor 78 is disposed on the support member 77. When this driving motor 78 is operated, the support member 77 moves along the longitudinal guide rails 75.

A pair of elevation cylinders 79 is disposed on a bottom side of the support member 77 in such a manner as to face each other in the conveying direction of the second feed conveyor 55, and their contractile rods 79a face downward. The lower end of each rod 79a rotatably supports a support shaft 81 of the transfer drum 76 disposed horizontally in the conveying direction of the second feed conveyor 55 through a bearing portion 80.

A large number of hole portions 82 are bored in an outer peripheral portion 76a of the transfer drum 76, which portion is shaped into a cylindrical shape, so as to penetrate through the wall to the inside. The hole portions 82 are dispersed in regular order throughout the entire peripheral surface 76b of the outer peripheral portion 76a. Right and left air suction/feed means 83 capable of sucking and supplying air are connected to these hole portions 82 through rotary joints 83A fitted to both end portions of the support shaft 81 which is shaped into a hollow shape.

Each air suction/feed means 83 includes air feed means 83a for feeding compressed air and air suction means 83b for sucking air. These air feed means 83a and air suction means 83b are connected to each rotary joint 83A by an air passage 83d through a solenoid switch valve 83c.

A driving motor 85 for driving the transfer drum 76 for rotation is disposed at the bearing portion 80 at one of the end portions through a bracket 84. An endless belt 88 is set between a pulley 86 fixed to the rotary shaft 85a of the driving motor 85 and a pulley 87 fixed to the end portion of the support shaft 81 disposed further outside the bearing 80 at one of the end portions, so as to transmit the rotation of the driving motor 85 to the support shaft 81.

Next, a method of supplying the sheet material according to the present invention by using the feed apparatus described above will be explained.

First, the elongated sheet material W is delivered from the sheet material feed means 51 in each material feed means 5A, 5B, 5C, and is supplied in predetermined length to the first and second feed conveyors 53, 55 through the guide rollers 60 while the adhesion preventive liner a is peeled off. The transfer of the sheet material W is then stopped. Subsequently, the elongated sheet material W on each second feed conveyor 55 is cut into a sheet material piece W1, W2, W3 having a predetermined size in accordance with the width to be wound on the building drum 1, by each corresponding cutting means 57.

Each sheet material W1, W2, W3 is transferred to the transfer drum 76 of the transfer means 7 positioned at the standby position above the second feed conveyor 55.

Figure 5A:
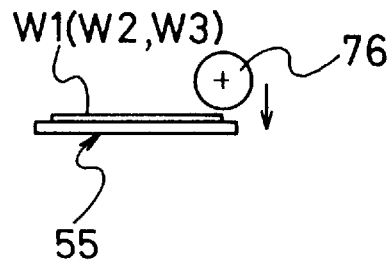
FIGS. 5(a) to 5(f) are explanatory views showing winding steps of the sheet material, which is cut into a predetermined size, on a transfer drum of the transfer means.
Figure 5B:
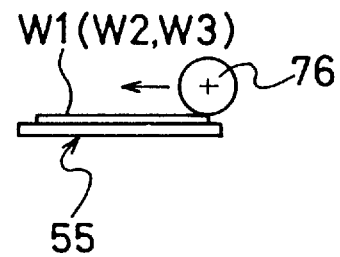

The transfer drum 76 moves down due to the extending operation of the elevation cylinder 79 as shown in FIG. 5(a). The transfer drum 76 comes into contact with one of the ends of the sheet-like material as shown in FIG. 5(b).

Figure 5C:
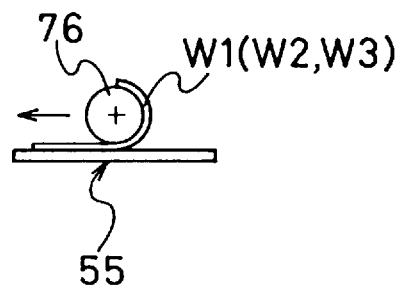
Figure 5D:
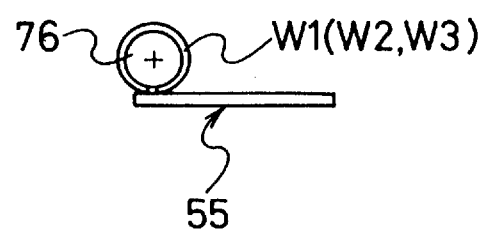

The air suction means 83b of the air suction/feed means 83 then operates, sucks the sheet material from the hole portions 82 formed in the outer peripheral portion 76a of the transfer drum 76 and sucks and holds one of the end portions of the sheet-like material on the outer peripheral surface 76b of the transfer drum 76. At the same time, the driving motors 78, 85 start operating, and move in the direction indicated by an arrow X in FIG. 1 along the longitudinal guide rails 75 while rotating the transfer drum 76. As shown in FIGS. 5(b) to 5(d), the sheet material is sequentially wound on the transfer drum 76 from one of the sides thereof to the other while being sucked onto the outer peripheral surface 76b of the transfer drum 76, and is held there. At this time, both end portions of the sheet material are a bit spaced apart from each other without overlapping on a bottom side of the transfer drum 76, as shown in FIGS. 5(d) and 5(e).

Figure 5E:
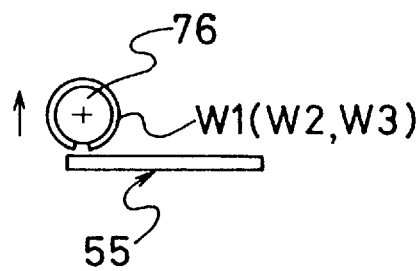

Subsequently, the transfer drum 76 moves up due to the operation of the elevation cylinder 79 as shown in FIG. 5(e) and returns to the upper standby position.

Figure 5F:
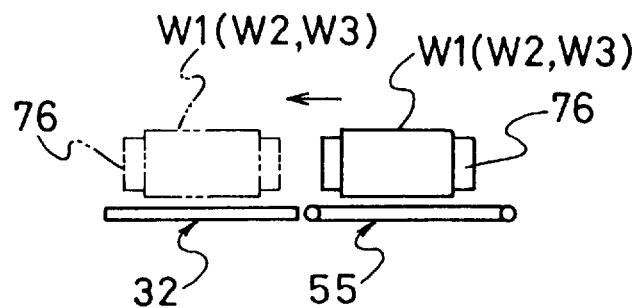

Under this state, the sheet material W1 with a predetermined size (the first sheet material to be assembled) which is to be disposed on the outermost layer side is first transferred from the material feed means 5A onto the conveyor belt 32a of the lamination conveyor 32. The slide member 73 moves in the direction indicated by an arrow Y in FIG. 1 by the operation of the moving cylinder 74, and the transfer drum 76 moves above the conveyor belt 32a of the lamination conveyor 32 (FIG. 5(f)).

Subsequently, the transfer drum 76 moves down due to the extension operation of the elevation cylinder 79. When the first sheet material W1 wound on the transfer drum 76 comes into contact with the conveyor belt 32a of the lamination conveyor 32, the operation of the elevation cylinder 79 stops. As the solenoid switch valve 83c effects the switching operation, the air feed means 83a of the air suction/feed means 83 operates and blasts air from the hole portions 82 of the transfer drum 76 in order with the rotation of the transfer drum 76. At the same time, the driving motors 78, 85 start operating and move the transfer drum 76 along the longitudinal guide rails 75 in the direction X' opposite to the direction X in FIG. 1 while rotating this drum 76. The first sheet material W1 is sequentially peeled off from the transfer drum 76 from the other end side to one of the end sides and is transferred onto the conveyor belt 32a of the lamination conveyor 32 (the position indicated by two-dot-chain lines in FIG. 6(a)). As the lamination conveyor 32 operates, the first sheet material W1 moves on the conveyor belt to the position at which it is to be laminated, as indicated by the solid line in FIG. 6(a).

When the first sheet material W1 of the outermost layer is conveyed to the lamination position, the second sheet material W2 (the sheet material to assembled) to be laminated inside the first sheet material W1 starts being conveyed. In other words, the second sheet material W2 is moved above the conveyor belt 32a of the lamination conveyor 32 from the material feed means 5B disposed on one of the sides of the lamination position, in the same way as described above.

Figure 6A:
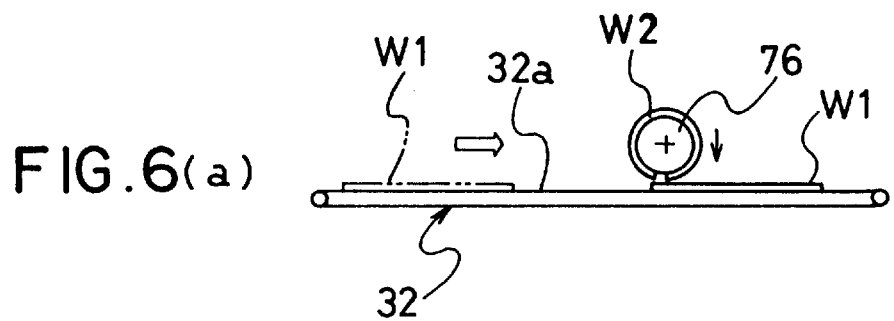
FIGS. 6(a) to 6(e) are explanatory views showing piling steps of the sheet materials by the transfer drum of the transfer means.
Figure 6B:
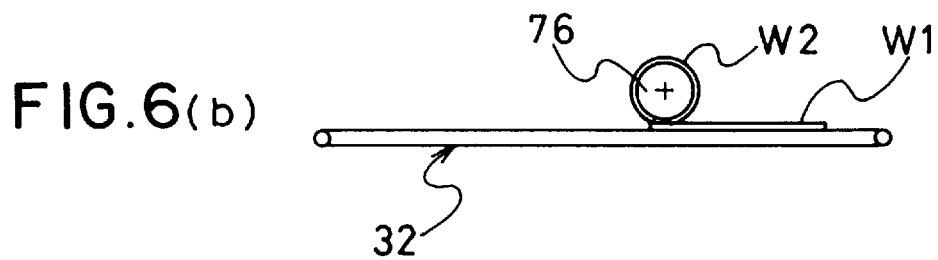
Figure 6C:
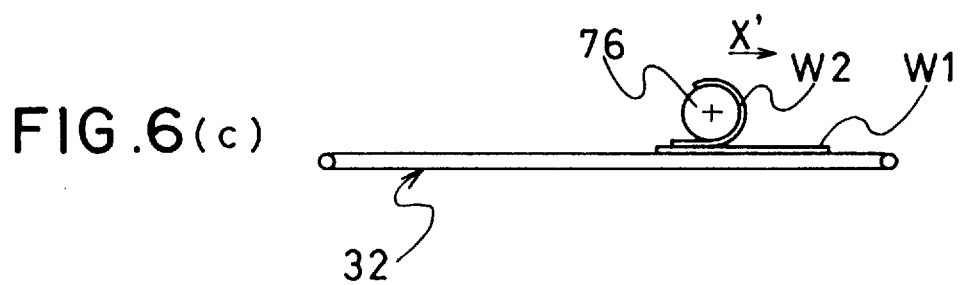
Figure 6D:
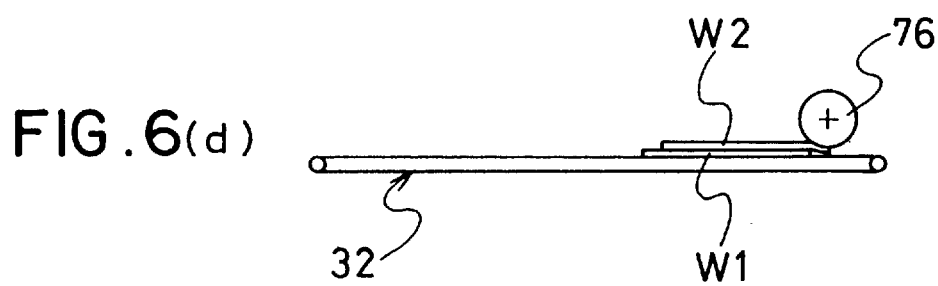

Due to the extension operation of the elevation cylinder 79, the transfer drum 76 moves down while both end portions of the second sheet material W2 wound on the drum 76 face downward as shown in FIG. 6(a). The drum presses the end portion to the other end side (trailing side in the conveying direction) of the first sheet material W1 while the end portion of the second sheet material W2 is deviated a little from one of the end portions of the first sheet material W1 as shown in FIG. 6(b).

The air feed means 83a of the air suction/feed means 83 operates and blasts air from the hole portions 82 of the transfer drum 76 and at the same time, the driving motors 78, 85 operate and move the transfer drum 76 in the direction X' in FIG. 1 along the longitudinal guide rails 75 while rotating this drum 76 as shown in FIGS. 6 (b) to (d). The second sheet material W2 peels sequentially from the transfer drum 76 from the other end thereof to one of the ends thereof, and is pressed and laminated sequentially onto the first sheet material W1 which is at halt on the conveyor belt 32a. Because the second sheet material W2 is sequentially pressed and laminated with the first sheet material W1, air which is otherwise residual between the first and second sheet materials W1 and W2 is sequentially purged and lamination can be thus carried out. Accordingly, it becomes possible to drastically reduce air reservoirs, which have occurred in the prior art, and to eliminate an air removal step.

Figure 6E:
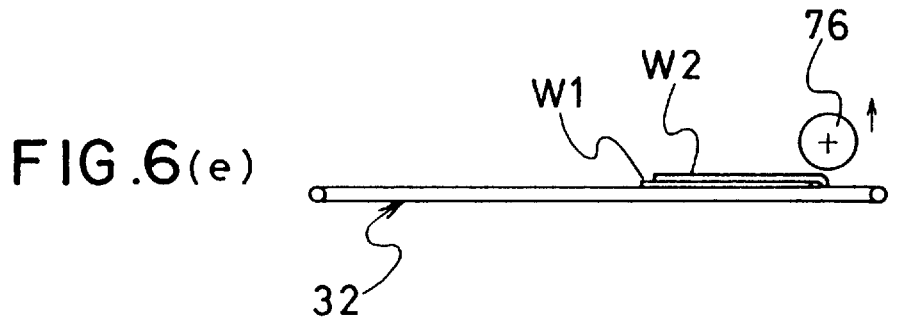

After the second sheet material W2 is laminated, the transfer drum 76 moves up as shown in FIG. 6e and returns to the standby position above the second feed conveyor 55. Next, the third sheet material W3 to be disposed further inside (that is, the innermost layer wound on the building drum 1 in this embodiment) is supplied by the transfer means 7 from the material feed means 5C disposed on the other side of the lamination position, in the same way as described above, and is laminated on the second sheet material W2 while their end portions are deviated from one another in such a manner that the end portions, on the conveying side, of the second sheet materials on the inner sides are farther deviated towards the building drum 1. In this way, a laminate body Z can be shaped.

During the transferring process described above, the sheet materials cut into a predetermined size are sequentially formed on the second feed conveyor 55 of each material feed means 5. When the transfer drum 76 returns to the standby position above the second feed conveyor 55, each transfer means 7 sequentially takes up the sheet materials cut into a predetermined size on the transfer drum 76 and waits for the next assembling operation at the standby position.

The laminate body Z comprising the first, second, and third sheet materials W1, W2, W3 is conveyed from the lamination conveyor 32 to the applying conveyor 31. As indicated by two-dot-chain lines in FIG. 1, the applying conveyor 31 moves to the position below the building drum 1, and its conveying side for starting applying moves up to the applying position of the building drum 1 and contacts the front end portion of the laminate body Z to the building drum 1. The laminate body Z is wound on the rotating building drum 1 by setting the conveying speed of the applying conveyor 31 to the same speed as the rotating speed of. The building drum 1, and the laminate body formed by laminating and applying the sheet materials in such a manner that their both end portions overlap with one another is formed on the building drum 1. Unlike the prior art wherein the first, second and third sheet materials W1, W2, W3 are assembled one by one, the present invention forms in advance the laminate body Z comprising these sheet materials and supplies it to the building drum 1. Accordingly, the sheet materials can be efficiently laminated and applied on the building drum 1.

While the laminate body Z is wound on the building drum 1, the conveying processes described above are sequentially carried out on the lamination conveyor 32.

Figure 7:
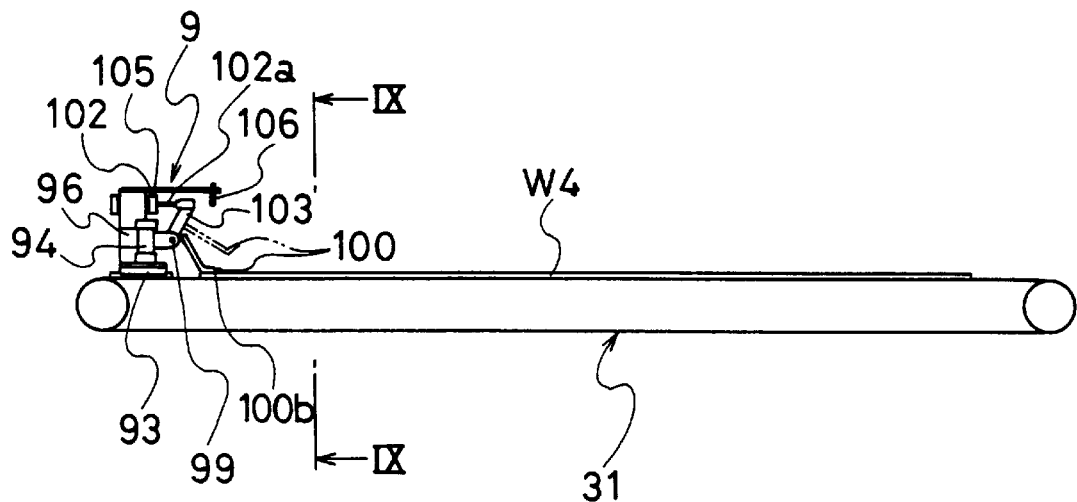
FIG. 7 is a schematic side view when restriction means for restricting the rear end portion of the sheet material is disposed on a applying conveyor.
Figure 8:
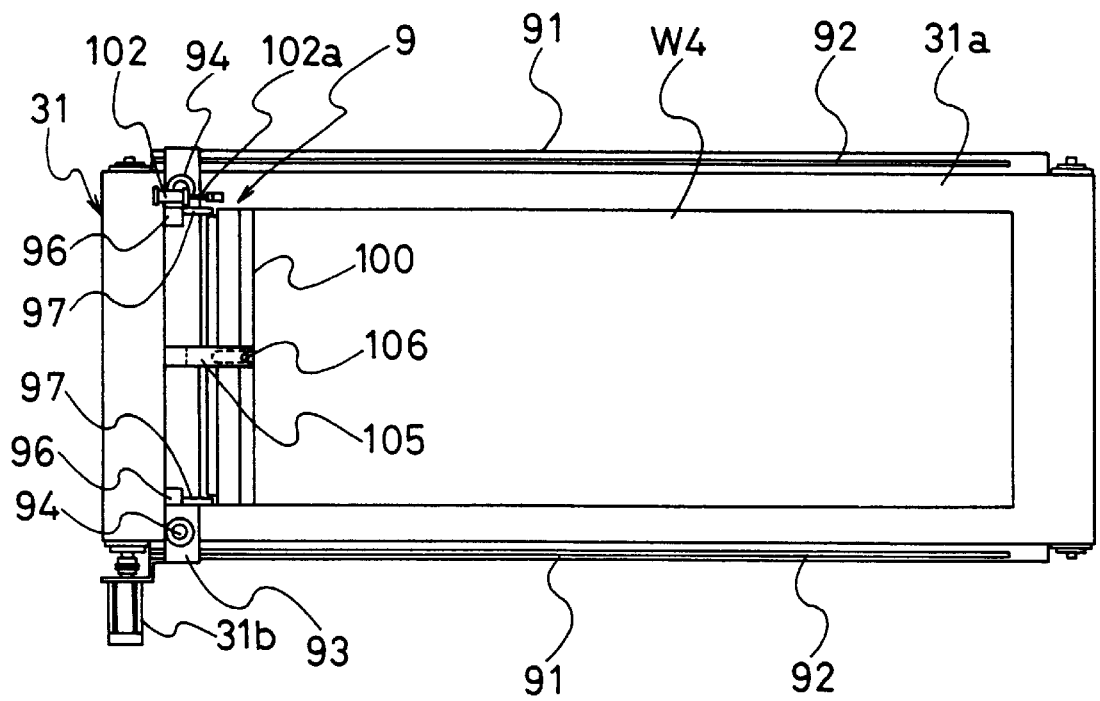
FIG. 8 is a plan view of FIG. 7.
Figure 9:
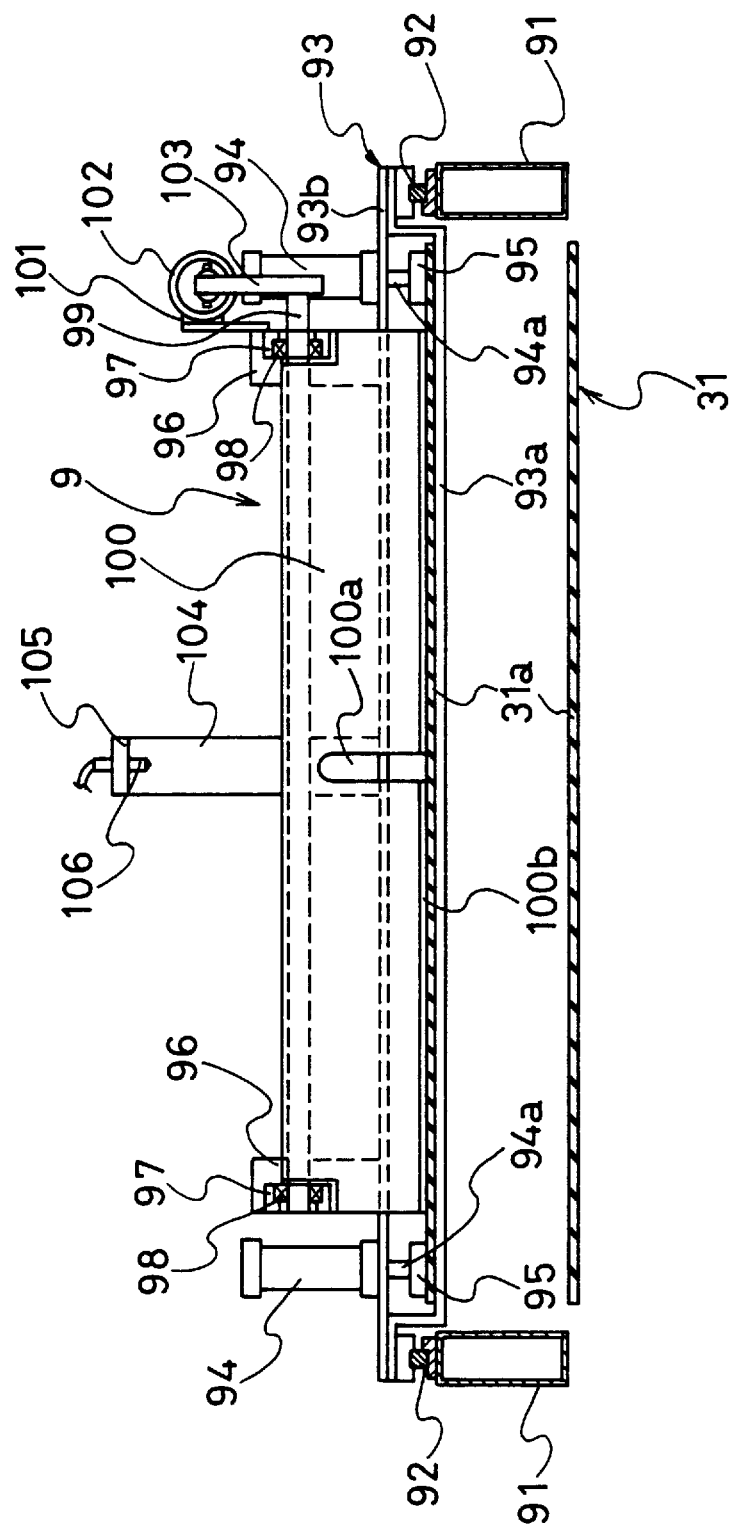
FIG. 9 is an enlarged sectional view taken along a line IX—IX of FIG. 7.

FIGS. 7 to 9 show parts of another embodiment. When a sheet material W4 (for instance, the second carcass) is further applied to the laminate body Z on the drum 1 in the apparatus having the construction described above, this apparatus can easily satisfy such a requirement without disposing additional material feed means 5 for supplying and conveying the sheet material W4 and transfer means 7. In this embodiment, restriction means 9 for restricting the rear end portion of the sheet material W4 is disposed adjacent to the applying conveyor 31.

The restriction means 9 includes a moving portion 93 which reciprocates along right and left guide rails 92 laid down on a pair of support frames 91 so disposed as to extend along the applying conveyor 31 on both sides thereof. The moving portion 93 includes a lower plate 93a disposed inside the endless conveyor belt 31a of the applying conveyor 31 in such a manner as to cross the conveyor belt 31a moving thereabove in the transverse direction and in the proximity of the conveyor belt 31a and an upper plate 93b disposed above the conveyor belt 31a in such a manner as to cross this conveyor belt 31a in the transverse direction.

A pair of right and left clamp cylinders 94 are disposed on both sides of the upper plate 93b so as to clamp the conveyor belt 31a in cooperation with the lower plate 93a. A push member 95 for pushing the conveyor belt 31a is fixed to the lower end of a contractible rod 94a protruding downward from the each clamp cylinder 94. Accordingly, the push members 95 push the conveyor belt 31a with the operation of the clamp cylinder 94 and the conveyor belt 31a is clamped between the push members 95 and the lower plate 93a. In consequence, the moving portion 93 moves in the same direction as the conveyor belt 31a with the movement of the conveyor belt 31a.

A pair of right and left support members 96 are erected on both sides of the upper plate 93b inside both clamp cylinders 94, and a transverse member 97 is fixed at the upper part of each support member 96 in such a manner as to protrude in the conveying direction of the applying conveyor 31.

A shaft member 99 is rotatably supported between the distal end portions of both transverse members 97 through bearings 98, and a holding portion for pushing and holding the rear end portion of the fourth sheet material W4 on the conveyor belt 31a is disposed on this shaft member 99. This holding portion comprises a pressing plate comprising a leaf spring substantially L-shaped in section, and the rear end portion of the fourth sheet material W4 is clamped between this pressing plate 100 and the conveyor belt 31a. A notch portion 100a is formed at the central portion of the pressing plate 100 in the conveying direction in order to detect the rear end of the fourth sheet material W4 by a later-appearing edge sensor 106.

A pressing cylinder 102 is fitted to one of the support members 96 through a bracket 101. The rear end portion of an arm member 103 is interconnected to the front end portion of a contractible rod 102a protruding horizontally from the pressing cylinder 102, and the front end portion of this arm member 103 is connected to one of the ends of the shaft member 99 described above. Accordingly, when the contractible rod 102a is extended by the operation of the pressing cylinder 102, the shaft member 99 rotates and the pressing plate 100 turns downward, so that its front end portion 100b pushes and holds the rear end portion of the fourth sheet material W4. When the contractible rod 102a undergoes contraction, the shaft member 99 rotates in the opposite direction, and the pressing plate 100 turns upward as indicated by the two-dot-chain line in FIG. 7, thereby releasing the push operation of the rear end portion of the fourth sheet material W4.

A sensor support member 104 is erected at the center of the upper plate 93b, and an edge sensor 106 comprising a photoelectric tube, etc, for detecting the rear edge of the fourth sheet material W4 is fitted to the front end portion of a protruding plate 105 so fitted to the upper portion of this sensor support member 104 as to extend transversely in the conveying direction. The edge sensor 106 detects the rear edge of the fourth sheet material W4 positioned below the pressing plate 100, through the notch portion 100a described above. When the edge sensor 106 detects the rear edge of the fourth sheet material W4 that is being conveyed, the applying conveyor 31 is stopped, the pressing cylinder 102 operates, and the pressing plate 100 pushes the rear end portion of the fourth sheet material W4.

Incidentally, reference numeral 31b in FIG. 8 denotes a driving motor for driving the conveyor belt 31a for rotation.

FIG. 10 shows the applying process by the restriction means 9 described above. The sheet materials to be applied on the building drum 1 are applied in such a manner that one end portion of each material overlaps the other end portion, of the next lower sheet material and an outer disposed material has a larger length than an inner disposed material. Accordingly, when the fourth sheet material W4 is applied further on the laminate body Z, a material having a winding length which is a little greater than that of the outermost first sheet material W1 becomes necessary. In the case described above, the fourth sheet material W4 which is made from the same elongated sheet material W as that of the first sheet materials W1 can be applied onto the laminate body Z on the building drum 1. In this case, the restriction means 9 described above becomes effective.

The fourth sheet material W4 cut into the predetermined size(in case of a carcass, its width is different from the first sheet material W1) is supplied from the material feed means 5A to the lamination conveyor 32 and is then conveyed to the applying conveyor 31 in the same way as described above.

Figure 10A:
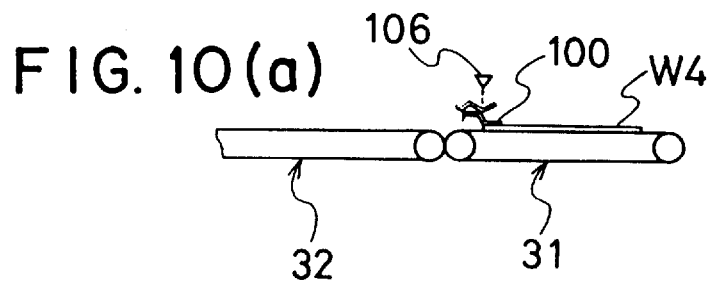
FIGS. 10(a) to 10(e) are explanatory views showing applying steps of the sheet material by the restriction means.

The fourth sheet material W4 is conveyed on the conveyor belt 31a of the applying conveyor 31. When the rear end of this fourth sheet material W4 is detected by the edge sensor 106, the operation of the applying conveyor 31 stops. Subsequently, the pressing cylinder 102 operates, the pressing plate 100 pushes the rear end portion of the fourth sheet material W4 as shown in FIG. 10(a), and the rear end portion of the fourth sheet material W4 is then held between the conveyor belt 31a and the pressing plate 100. At the same time, the clamp cylinder 94 starts operating, the push members 95 push the conveyor belt 31a, and the conveyor belt 31a is clamped between the push members 95 and the lower plate 93a.

Figure 10B:
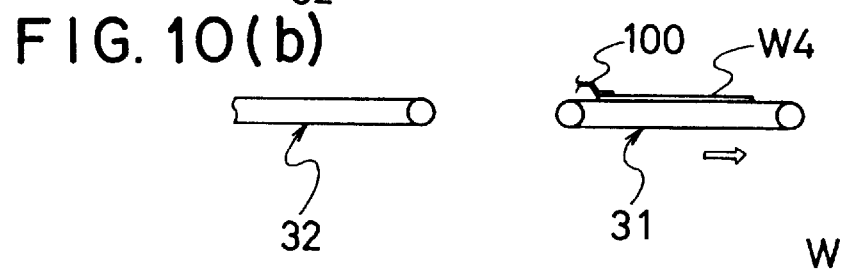
Figure 10C:
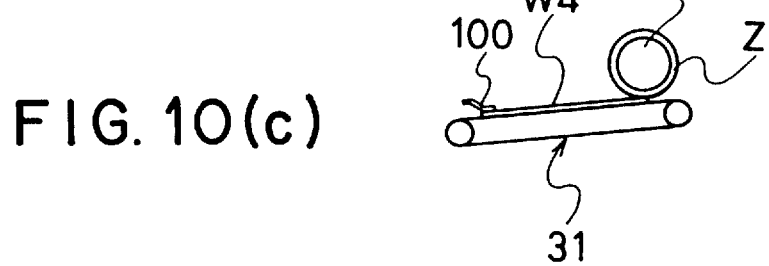

The applying conveyor 31 advances as shown in FIG. 10(b) to the applying position when it reaches the applying position under the building drum 1, its front end side goes up and the front end of the fourth sheet material W4 on the conveyor belt 31a is touched and applied to the laminate body Z on the building drum 1 as shown in FIG. 10(c).

Figure 10D:
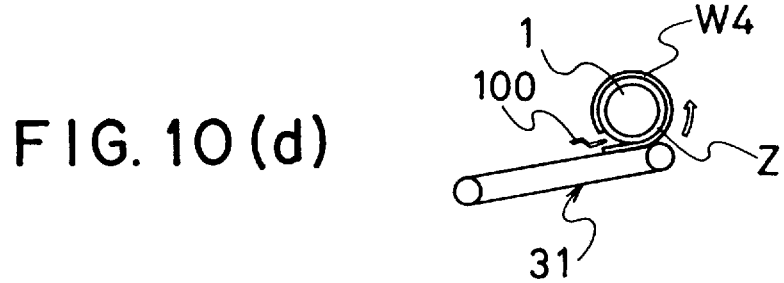
Figure 10E:
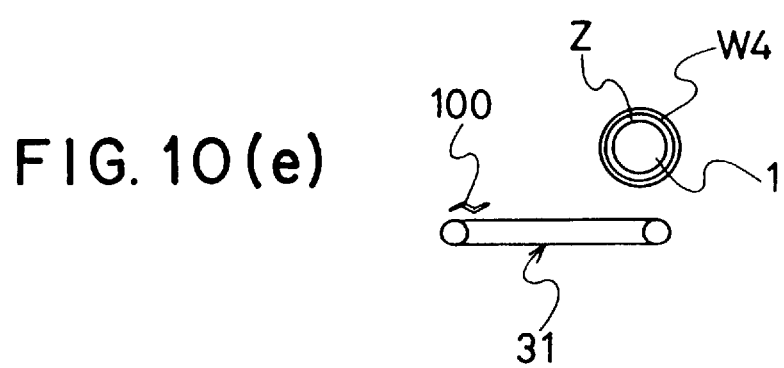

The building drum 1 and the applying conveyor 31 operate under this state. The conveying speed of the applying conveyor 31 is adjusted to be somewhat lower than the rotating speed of the building drum 1 (to the speed corresponding to the stretching length equivalent to a difference of circle length), and the fourth sheet material W4 is so wound on the laminate body Z. At this time, the rear end portion of the fourth sheet material W4 is restrained by the pressing plate 100 disposed on the moving portion 93 of the restriction means 9 that moves with the conveyor belt 31a of the applying conveyor 31. Therefore, the fourth sheet material W4 is applied onto the laminate body Z while it is being stretched. The push operation of the pressing plate 100 is released immediately before completion of the applying operation of the fourth sheet material W4 as shown in FIG. 10(d). When the fourth sheet material W4 is applied on the laminate body Z, the front end portion of the applying conveyor 31 lowers, the moving portion 93 having the pressing plate 100 fitted thereto returns to the position at the back in the conveying direction of the applying conveyor 31 (FIG. 10(e)) and the applying conveyor 31 moves back and returns to the position shown in FIG. 10(a)).

As described above, the fourth sheet material W4 having a shorter length than the required length is applied onto the laminate body Z while being stretched. Therefore, it can be applied while both of its end portions are overlapped with each other. As a result, the fourth sheet material W4 can be applied onto the laminate body Z without disposing additionally the material feed means 5 and the transfer means 7 suited to the fourth sheet material W4. In case that a second carcass is applied as the fourth sheet material W4, the air problem almost doesn't matter. Because the carcass, which has reinforced cords therein, has pricking treatment before applying.

In this embodiment, the fourth sheet material W4 is stretched more reliably by the adjustment of the relative conveying speed of the fourth sheet material W4 between the building drum 1 and the applying conveyor 31 and by using the restriction means 9, but the length of the fourth sheet material W4 can be increased by only adjusting the rotating speed of the building drum 1 and the conveying speed of the applying conveyor 31.

FIGS. 11 show another applying steps of the fourth sheet material W4. The applying conveyor 31 is constructed in such a manner that the laminate body Z and the fourth sheet material W4 can be conveyed on a same conveyor belt 31a. After the laminate body Z is wound on the building drum 1, the fourth sheet material W4 is applied onto the laminate body Z consecutively.

Figure 11A:
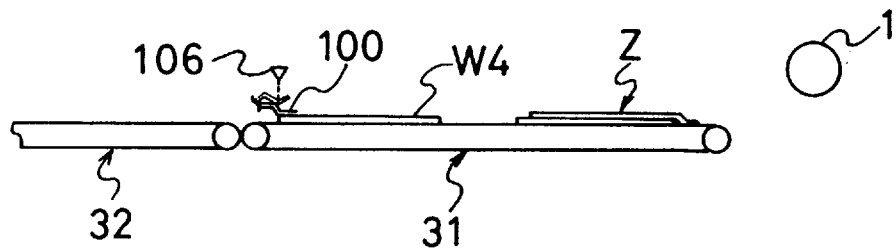
FIGS. 11(a) to 11(f) are explanatory views showing another applying steps that the laminate body and a sheet material are wound onto the building drum sequentially using the restriction means.

FIG. 11(a) shows the state that laminate body Z and the fourth sheet material W4 are on the conveyor belt 31a of the applying conveyor 31, conveyed from the lamination conveyor 32. The rear end portion of the fourth sheet material W4 is held by the pressing plate 100.

Figure 11B:
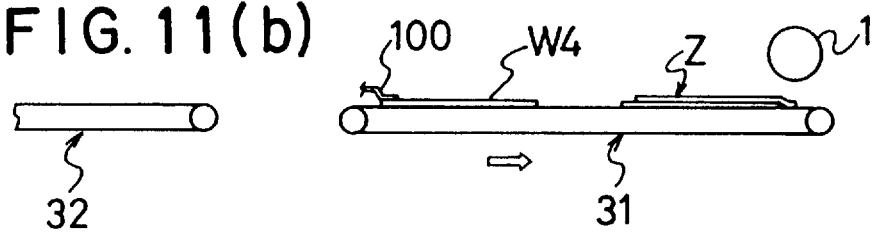
Figure 11C:
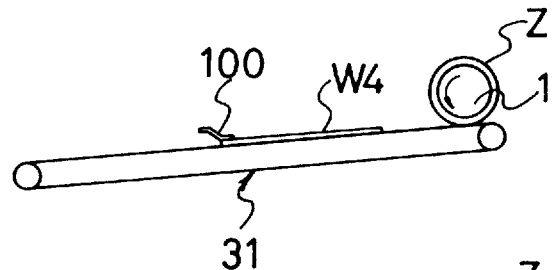

FIG. 11(b) shows the state that the applying conveyor 31 advances to the applying position under the building drum 1 and FIG. 11(c) shows the state that the laminate body Z is wound on the building drum 1 in the same way described above after the front end side of the applying conveyor 31 rises.

Figure 11D:
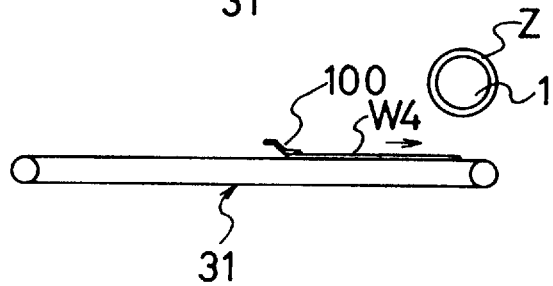

FIG. 11(d) shows the state that the front end side of the applying conveyor 31 goes down and the fourth sheet material W4 is conveyed to the applying position under the drum 1 after the completion of applying the laminate body Z.

Figure 11E:
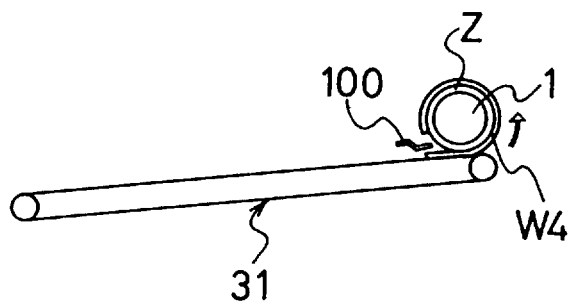
Figure 11F:
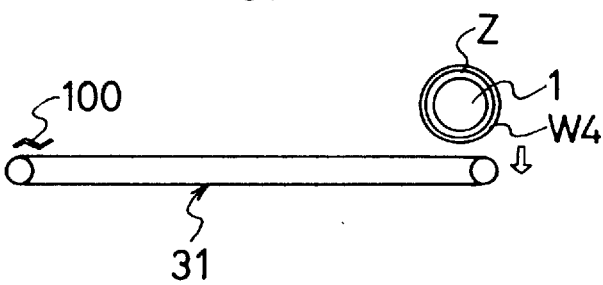

FIG. 11(e) shows the state that the fourth sheet material W4 is wound onto the laminate body Z on the building drum 1 as described above after the front end side of the applying conveyor 31 goes up. FIG. 11(f) shows the state that the front end side of the applying conveyor 31 goes down and the pressing plate 100 returns to the back position.

When it is known in advance that the fourth sheet material W4 is wound onto the laminate body Z, they are supplied in the way described above. Therefore, the laminate body Z and the fourth sheet material W4 are wound onto the drum 1 very efficiently without losing time. The embodiments shown in FIGS. 7–11 show a sheet of material W4 is laminated on the laminate body Z, but two sheets can be supplied if needed. In such a case, not only each sheets can be wound on the laminate body Z respectively but also a laminate body comprised the two in advance can be done instead of the three described above.

In the embodiments of the present invention described above, the applying conveyor means 3 comprises the applying conveyor 31 and the lamination conveyor 32, but when a sufficient time margin can be secured at each process step, it may comprise one conveyor having the functions of the applying conveyor 31 and the lamination conveyor 32.

When the sheet materials cut into a predetermined size are conveyed from the material feed means 5 to the applying conveyor means 3, each transfer means 7 uses the transfer drum 76, but because the transfer means for transferring the outermost sheet material W1 need not laminate this sheet material, a heretofore known flat sheet transfer plate can be employed to the transfer means for the sheet material W1.

In the embodiments described above, the laminate body z comprising three sheet materials is supplied to the building drum 1, but the number of the sheet materials can be of course increased or decreased, whenever necessary.

As described above, the present invention forms in advance the laminate body by assembling onto other the sheet materials to be applied, on the conveyor belt of the applying conveyor means and winds this laminate body on the building drum. Accordingly, the present invention can reduce the applying time in comparison with the prior art wherein the sheet materials are applied one by one, and can efficiently apply a plurality of sheet materials on the building drum.

Moreover, as the transfer drum is moved while being rotated, the first sheet material, which is wound on the transfer drum, presses the second sheet material sequentially from one of the sides to the other and the second sheet material is laminated. Therefor, air which would otherwise be residual between the sheet materials can be sequentially purged. Accordingly, the air removal step can be eliminated because the occurrence of the air pockets can be reduced drastically.

What is claimed is:

1. An apparatus for supplying sheet materials which are tire constituent materials to be applied in layers, comprising:

a building drum:

an applying conveyor means disposed adjacent to and facing said building drum for applying at least first and second sheet materials to said building drum;

at least two material feed means for supplying said at least first and second sheet materials onto a conveyor belt of said applying conveyor means, disposed adjacent to said applying conveyor means; and plural transfer means for transferring said at least first and second sheet materials from said material feed means to said applying conveyor means, disposed between each of said material feed means and said applying conveyor means; wherein at least said transfer means for transferring said first sheet material, among said plural transfer means, includes a transfer drum capable of winding each first sheet material on the peripheral surface thereof and retaining it, said transfer drum being disposed rotatably and movably up and down above said material feed means and being capable of reciprocating between said applying conveyor means and said material feed means and in a conveying direction of said applying conveyor means; and wherein a sheet material is sequentially pressed and laminated from one of the end sides thereof to a sheet material on said conveyor belt of said conveyor means by rotating and moving said transfer drum.

2. The apparatus for supplying sheet materials according to claim 1, wherein said transfer drum has an outer peripheral portion shaped into a cylindrical shape, a plurality of hole portions are dispersedly formed in said outer peripheral portion in such a manner to penetrate therethrough to the inside, and air suction/feed means capable of sucking and supplying air is connected to said hole portions.

3. The apparatus for supplying sheet materials according to claim 1, wherein said material feed means is disposed in such a fashion that the conveying direction of said sheet materials thereof crosses the conveying direction of said applying conveyor means.

4. The apparatus for supplying sheet materials according to claim 3, wherein said material feed means and said applying conveyor means are disposed so that their conveying directions orthogonally cross each other.

5. The apparatus for supplying sheet materials according to claim 4, wherein each of said at least first and second sheet materials has at the time of winding on said building drum a longitudinal axis and a lateral axis perpendicular to said longitudinal axis, said material feed means convey said sheet materials in a direction parallel to said lateral axis, said applying conveyor means conveys said sheet materials in a direction parallel to said longitudinal axis, and said transfer drum winds each sheet material existing on said material feed means along said longitudinal axis thereof, and sucks and holds said sheet material.

6. The apparatus for supplying sheet materials according to claim 1, wherein each of said material feed means comprises an elongated sheet material feed means for supplying elongated sheet material, first and second feed conveyors disposed between said elongated sheet material feed means and said applying conveyor means and cutting means for cutting said elongated sheet material into a predetermined size, disposed between said first and second feed conveyors.

7. The apparatus for supplying sheet materials according to claim 1, wherein said applying conveyor means comprises an applying conveyor so disposed as to oppose said building drum and a lamination conveyor for supplying a laminate body of said sheet materials to said applying conveyor.

8. The apparatus for supplying sheet materials according to claim 7, wherein the conveying speed of said applying conveyor and the rotating speed of said building drum are interlocked with each other, and their relative speed can be regulated.

9. The apparatus for supplying sheet materials according to claim 8, wherein restriction means capable of restricting the rear end portion of said sheet material cut into a predetermined size is disposed adjacent to said applying conveyor, and said restriction means is so constituted as to be capable of moving with said conveyor belt of said applying conveyor in the conveying direction of said applying conveyor, and has a holding portion capable of holding the rear end portion of said sheet material on said conveyor belt.

10. The apparatus for supplying sheet materials according to claim 1, wherein said sheet material on said conveyor belt has a larger length than said sheet material pressed and laminated thereto.

* * * * *